Figure 1:
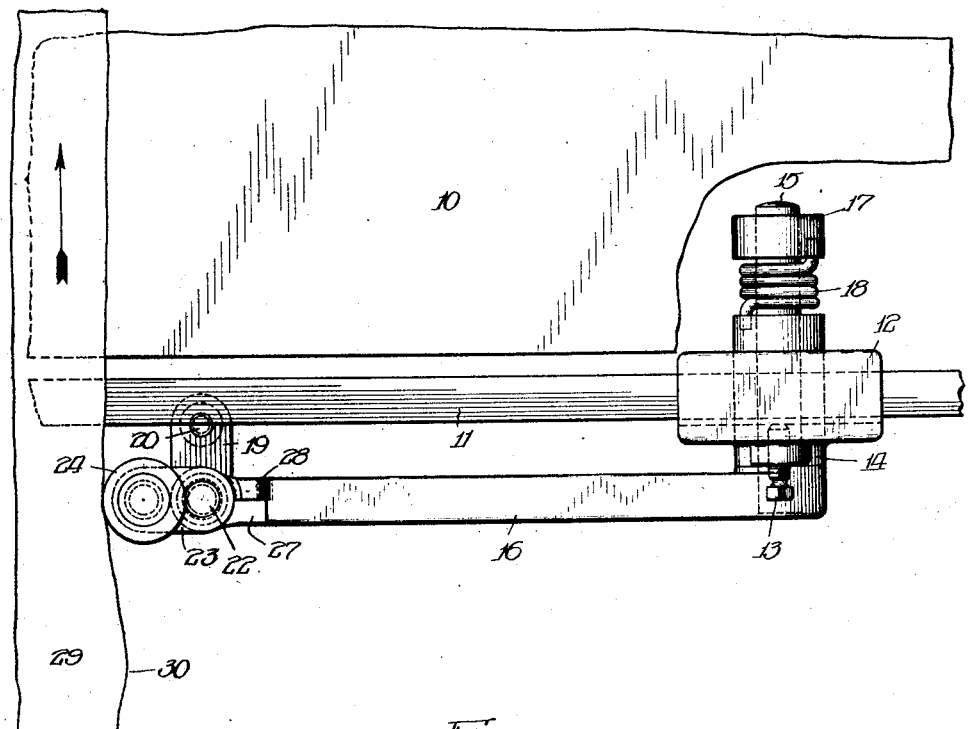

F. L. LANE.
BOARD GUIDE.
APPLICATION FILED JUNE 26, 1920.

1,405,599.

Patented Feb. 7, 1922.

Witness:
R. Burkhardt

Inventor:
Franklin L. Lane
By Walter M. Fuller

UNITED STATES PATENT OFFICE.

FRANKLIN L. LANE, OF BELOIT, WISCONSIN, ASSIGNOR TO P. B. YATES MACHINE COMPANY, OF BELOIT, WISCONSIN, A CORPORATION OF WISCONSIN.

BOARD GUIDE.

1,405,599.  Specification of Letters Patent.  Patented Feb. 7, 1922.

Application filed June 26, 1920. Serial No. 391,936.

*To all whom it may concern:*

Be it known that I, FRANKLIN L. LANE, a citizen of the United States, residing at Beloit, in the county of Rock and State of Wisconsin, have invented certain new and useful Improvements in Board Guides, of which the following is a specification.

My invention concerns guides for the boards fed to wood-working machines, such for example, as circular-saws to which the work is fed by an endless traveling chain or bed to which the lumber is held by pressure-rollers located above the bed. It is desirable in such and similar machines to provide a guide or index of some character to assist the operator in properly placing the board for feeding to the saw. To this end a pointer, index, or finger in the plane of the saw is mounted in any appropriate manner, as for instance, on the shield or cover for the front pressure-roller, and this enables the workman to start in the front end of the board to remove from its edge the desired amount of material, the index operating as a sight of which the workman avails himself. Such appliance of itself is not sufficient to assure that the remainder of the board is correctly lined up and accordingly it has been heretofore suggested to employ a properly-positioned preferably-adjustable supplementary or complementary guide at the front end of the table of the machine against which the edge of the board is adapted to bear. Such guide for the board's edge is not intended to perform the function of a side-gauge, but is merely employed in initially positioning the board correctly with relation to the saw. If, therefore, the board's edge is not substantially straight and if such guide is fixed or stationary, the latter may force the board sideways during its travel out of its true and correct position with resulting improper feeding to the saw.

It is accordingly an object and purpose of this invention to provide a construction of simple character which will permit of the guide to be temporarily deflected out of the way by the board after the latter has been once properly positioned, the guide being desirably so constructed as to return automatically to normal operative position as soon as the board has passed by.

To enable those skilled in this art to have a full and complete understanding of this invention both from structural and functional standpoints I have illustrated a desirable embodiment of the invention in the accompanying drawing forming a part of this specification and in the two views of which like reference characters refer to the same parts.

In this drawing—

Figure 2:
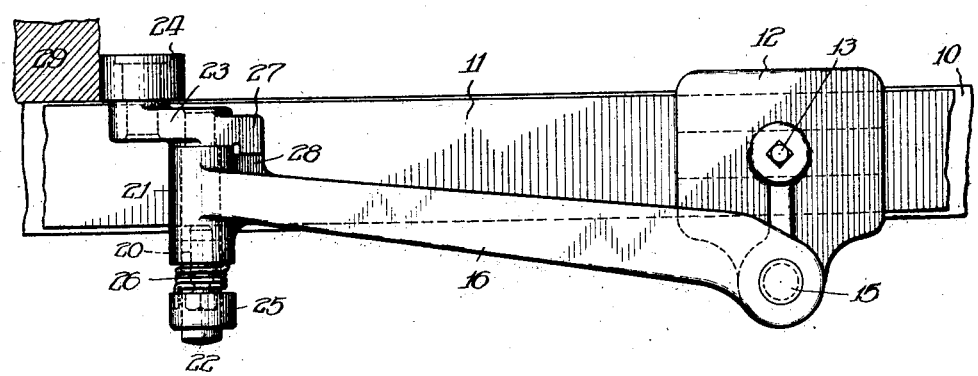

Figure 1 is a fragmentary plan view of a portion of the table of the machine showing the improved and novel guide attached in position; and Figure 2 is an elevation of the same construction.

Referring to the drawing, it will be noted that the front portion only of the table 10 of the machine is shown to which a cross-bar 11 is attached so as to extend across the front edge of the table and spaced away therefrom. On such bar the board-guide specified is adjustably secured whereby its position may be readily changed or modified as circumstances dictate.

Such guide comprises a block 12 mounted for longitudinal adjustment on the bar 11 and fitted with a set screw 13 bearing on an internal pressure-plate not shown in detail by which it may be firmly and fixedly secured in adjusted position. At its lower end such member 12 has a bearing 14 for a rock-shaft 15 to the front end of which an arm 16 is fixed in any approved manner. A collar 17 is fastened beneath the table 10 to the rear protruding end of the shaft leaving a substantial space between itself and the adjacent face of the bearing, which gap is utilized by a coil torsion spring 18 having one end secured to the stationary bearing and the other or opposite end fastened to the collar, whereby the spring by turning the shaft tends to rock the arm 16 upwardly.

At its free end arm 16 has a lateral, horizontal extension or ear 19 projecting beneath the bar 11 and provided with an adjustable stop-screw 20 in a threaded hole therein adapted to bear against the under face of the bar 11 and limit or restrict the upward movement of the rock arm on which it is mounted.

Also at its free end arm 16 has a vertical bearing 21 accommodating a shaft 22 having an arm 23 fixed to its upper end, such upper arm carrying an antifriction roller 24 adapted to project above the top surface of the table 10 and act as the guide for the edge of the board 29, a fragment only of which has been illustrated.

At its lower end shaft 22 has a collar 25 pinned or otherwise fixedly secured thereto, and between such collar and the lower face of the bearing a torsion spring 26 surrounds the shaft and has its two ends fastened to the bearing and collar respectively, the spring tending through its action on the shaft to swing the roller 24 forwardly away from the table and bar 11. To limit such movement and to hold the roller in normal operative position arm 23 is provided with a lug 27 adapted to bear against an abutment, finger or lug 28 upstanding from arm 16.

The appliance is employed substantially as follows:

Regularly or ordinarily the guide-roller 24 is above the upper surface of the saw-table and adapted to be engaged by the board 29 in positioning the latter for travel to the saw, not shown. Inasmuch as the axes of the roller and the shaft 22 are in the vertical plane of the longitudinal axis of the arm 16, the movement of the board sidewise against the guide-roller does not displace the latter. If after the board has been thus properly positioned for advancement to the saw and during such travel a projection 30 on the board's edge engages the roller, the latter against the action of spring 26 will be deflected temporarily rearwardly to allow such projection to pass by without in any way disturbing the right line travel of the board which, of course, is being drawn into the machine by the co-operating traveling bed (not shown) engaging its bottom face and the one or more pressure-rollers (not shown) bearing on its upper surface. If such guide-roller were incapable of such displacement, in other words, if it were fixedly or unyieldingly mounted in position, it would push the board sidewise out of correct relation with the saw when the projection on the side of the board bore on it. It is in such yielding construction of the roller that the present invention resides and not in the main elements of construction of the appliance.

Obviously, if the roller is deflected or swerved aside in the manner indicated, it will automatically return to normal or usual guiding position as soon as permitted to do so by the board.

In case it is desired to render the guide for the time being inoperative, as when a board is to be sawed lengthwise down the middle, the bottom face of the board engages the top surface of the roller and swings the arm 16 downwardly against the action of its lifting spring 18, the roller riding on the under surface of the board as it travels along. As soon as the board has passed, the arm 16 swings upwardly in response to the action of its spring, thus again raising the guide-roller above the face of the table ready for action.

This invention is not necessarily limited and restricted to the precise and exact details of construction shown and described because many minor mechanical changes may be incorporated in the structure without departure from the substance of the invention and without the sacrifice of any of its material advantages.

I claim:

1. A board-guide for wood-working machines, comprising in combination, a support, an element mounted for movement with relation to said support, a guide-member against which the edge of the board is adapted to bear to position the board movably mounted on said element to permit it to be shifted out of normal guiding position by the travel of the board edge thereon, means to automatically return said member to such normal position after such displacement, and spring means tending to hold said element in a position to render said guide-member operative but permitting the element to be depressed to carry the guide-member into inoperative position.

2. A board-guide for wood-working machines, comprising in combination, a support, an arm hinged on said support for vertical movement, a guide-member against which the edge of the board is adapted to bear to position the board, pivotally mounted on said arm to permit it to be swung out of normal guiding position by the travel of the board edge thereon, means to automatically restore said guide-member to such normal position after such displacement, and spring means acting on said arm tending to hold the arm in a position to render said guide-member operative but permitting the arm to be depressed to carry the guide-member into inoperative position.

3. A board-guide for wood-working machines, comprising in combination, a spring-pressed hinged arm, a stop thereon, a guide-member rockingly mounted on said arm having a lug adapted to engage said stop to hold said guide-member in operative position, a roller on said guide-member on which the edge of the board is adapted to bear, and a spring tending to rock said guide-member to hold its lug in engagement with said stop, said arm being adapted to be depressed against the action of its spring to carry the roller below the plane of the board, said guide-member and roller being adapted to be displaced by the travel of the edge of the board on the roller and to be automatically restored to normal guiding position by said spring after such displacement.

4. A board-guide for wood-working machines, comprising in combination, a table to support the lumber, an arm fulcrumed on said table and adapted to move in a vertical plane, a spring tending to rock said arm upwardly, a stop to limit such upward movement, a guide-member against which the edge of the board is adapted to bear to position the board movably mounted on said element to permit it to be shifted out of normal guiding position by the travel of the board edge thereon, and means to return said element to such normal position after such displacement, substantially as described.

FRANKLIN L. LANE.